Figure 1:
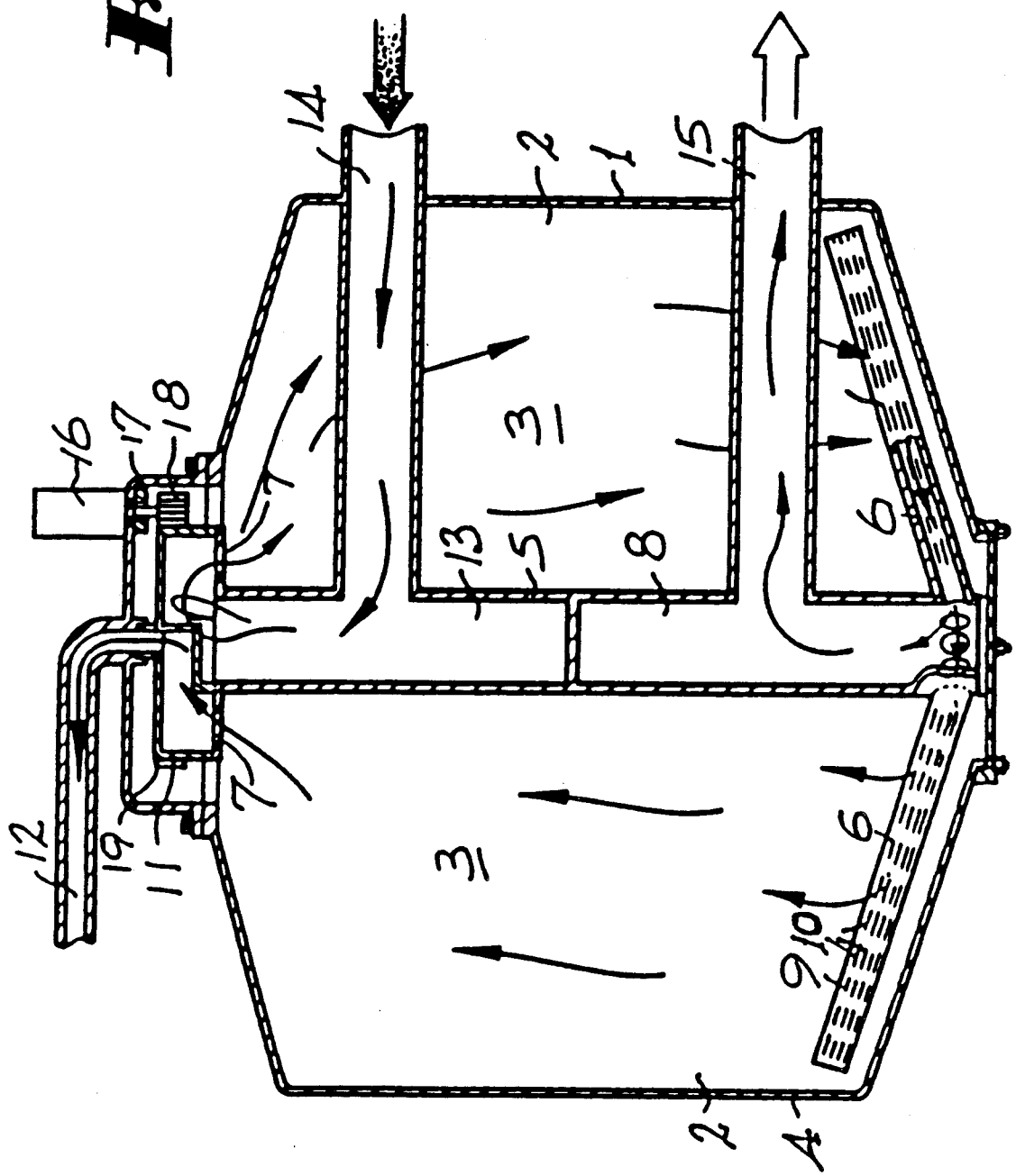

United States Patent [19]

Snelling

[11] Patent Number: 4,995,968
[45] Date of Patent: Feb. 26, 1991

[54] FILTERS

[76] Inventor: Peter J. Snelling, Unit 1, 14 Cocos Grove, West Lakes, Australia

[21] Appl. No.: 341,256

[22] Filed: Apr. 18, 1989

Related U.S. Application Data

[63] Continuation of Ser. No. 96,607, Jul. 20, 1987, abandoned.

[30] Foreign Application Priority Data

Nov. 21, 1985 [AU] Australia .................. PH3513

[51] Int. Cl.⁵ .................... B01D 25/00; B01D 29/38
[52] U.S. Cl. .................... 210/108; 210/138; 210/333.1; 210/411; 210/488; 210/498
[58] Field of Search .............. 210/108, 138, 142, 264, 210/277–279, 333.1, 411, 323.1, 333.01, 345, 347, 488, 498

[56] References Cited

U.S. PATENT DOCUMENTS

| | | | |
|---|---|---|---|
| 2,173,060 | 9/1939 | Andrews | 210/333.1 |
| 2,237,964 | 4/1941 | Haught | 210/108 X |
| 2,310,587 | 2/1943 | MacNeill | 210/411 |
| 3,149,070 | 9/1964 | Nash | 210/333.1 X |
| 3,547,270 | 12/1970 | Kass | 210/279 X |
| 3,557,959 | 1/1971 | Muller | 210/333.1 X |
| 3,635,348 | 1/1972 | Carr | 210/333.1 |
| 3,734,299 | 5/1973 | Akiyama | 210/333.1 |
| 3,739,914 | 6/1973 | Moatti | 210/333.1 |
| 3,853,762 | 12/1974 | Moatti | 210/333.1 X |
| 4,059,518 | 11/1977 | Rishel | 210/333.1 X |
| 4,062,777 | 12/1977 | Tsurta et al. | 210/264 |
| 4,082,664 | 4/1978 | Lindstol | 210/333.1 X |
| 4,321,961 | 3/1982 | Hemsath | 55/390 X |
| 4,415,448 | 11/1983 | Lennartz et al. | 210/333.1 |
| 4,582,603 | 4/1986 | Nasse | 210/333.1 X |
| 4,587,017 | 5/1986 | Christophe et al. | 210/333.01 X |
| 4,591,436 | 5/1986 | Hofstede | 210/264 |
| 4,673,498 | 6/1987 | Swinney et al. | 210/333.1 X |
| 4,678,564 | 7/1987 | Moorehead et al. | 210/411 X |
| 4,707,258 | 11/1987 | Drori | 210/333.1 |
| 4,753,731 | 6/1988 | Drori | 210/488 |
| 4,806,217 | 2/1989 | Rosenberg | 210/333.1 X |

FOREIGN PATENT DOCUMENTS

| | | | |
|---|---|---|---|
| 2737135 | 3/1979 | Fed. Rep. of Germany | 210/333.1 |
| 30652 | 9/1933 | Netherlands | 210/488 |
| 679224 | 8/1979 | U.S.S.R. | 210/333.1 |
| 709121 | 1/1980 | U.S.S.R. | 210/333.1 |

Primary Examiner—Robert Spitzer
Attorney, Agent, or Firm—Oldham & Oldham Co.

[57] ABSTRACT

A back flushable filter which has a number of separable sections (2) which can be separately accessed and there can be provided a flow pattern so that one of the sections is being back flushed while the other sections are providing normal filtering. A valve configuration (11) providing for such access can be inched around to select each section in term. The filter preferably comprises a stack of separable segments which provide for inclined gaps between adjacent parts of each adjoining stack element with the convergents and gap size selected to encourage compaction of particles within the converging part of each gap but further selected such that on back flushing such compacted particles can be readily disgorged for total cleansing.

5 Claims, 6 Drawing Sheets

FILTERS

This is a continuation of co-pending application Ser. No. 096,607 filed on Jul. 20, 1987, now abandoned.

This invention relates to back flushable filters

It is presently known to use filters comprising siliceous particles such as sand in which water is filtered by being caused to pass through the compacted sand particles and from time to time, a cleansing of the said is effected by causing water to flow in a contra direction hence causing the sand to rise against an otherwise compacted condition but being held against excessive removal by gravitational forces, but such that detritus, which will normally catch within water flow more effectively than sand particles, will be carried away by the so called back flushing water flow.

A number of problems do exist with such an arrangement in the conventional systems.

A first of these is that in order to effect an adequate back flushing, a sufficient water flow capacity must be provided to ensure that there is provided adequate flow to separate the detritus from the sand particles.

There is a further problem namely that in order to maintain sand within a filtering chamber a lowermost outlet is proved by a screen beneath which water will necessarily have to be provided for the back flushing step.

In order to provide sufficient quantity of water for adequate velocity, it is conventional that such water should be provided from a main volume of water provided by perhaps a storage tank or swimming pool or like and on most occasions, there is no assurance that such water is of itself clean.

The result in practice is that such water will have a primary filtering as it passes through the lowermost mesh so that this detritus will, when the water flow is reserved, be returned to the water storage.

This could perhaps be avoided by providing that a first shot of water subsequent to a back flushing step, should be directed to waste but this requires significant extra costs which can rarely be justified.

The further problem with present back flushing techniques is that because the velocities of water are inherently necessarily different, the capacity of pumps, pipes, and control valves must be all selected to allow for the back flushing capacity so that the cost is governed by a capacity which is necessarily far in excess of that which would normally be necessary for merely the filtering function.

I have discovered that the problems discussed can be at least significantly reduced by providing that the back flushable filter has parts which are separately accessible, so that a part only can be selected for a back flushing action while other parts of the filter are accessible for a conventional filtering process.

A first embodiment of the invention can be said then to reside in a back flushable filter comprising a body liquid filter means within the body adapted to provide for a filtering effect when liquid is directed in a first direction through the liquid filter means, and adapted to provide for a flushing effect when liquid is directed in an oppositve direction through the liquid filter means, the liquid filter means being divided into at least two parts in such a way that back flushing can be effected in at least one of the parts while filtering is being effected in the other of the parts and the valve means arranged to direct liquid flow through the parts while filtering is being effected in the other of the parts.

In preference, there are provided drive means adapted to drive said valve means, such that the valve means will be stepped through after a selected time from a first position to a second position whereby a back flushing effect is then effected in a further of the parts.

By having such separately accessible parts of a filter, there is a further significant advantage in that if a sufficiently larger part of the filter is provided for conventional filtering, a significant quantity of water is then available and a selected proportion of this can be used as completely filtered water to provide for sufficient capacity to effect a back flushing of another part of the filter. This avoids the use of pumps, pipes and control valves having a capacity to allow back flushing as some capacity if obtained from the conventional filtering process.

Because the water is being directly filtered and then provided from a lower end, there will be at most negligible detritus with the result that a significantly better filtering action can be expected.

Furthermore, however, the total capacity of water being necessarily pumped at one stage is governed then more by the capacity of the parts providing for conventional filtering and hence it can be expected that in commercial circumstances, a filter along the lines described can be made significantly more economically.

In preference, the back flushable filter is characterised in that the body is of substantially cylindrical shape, with the parts of the filter being divided into chambers or insectors by divisions radially extending from its axial centre, each chamber including an upper access aperture and a lower access aperture, the valve means being adapted to direct through put of a selected chamber either in the case of back flushing, from the lower access aperture to the upper access aperture, or, in the case of effecting filtering from an upper access aperture through the chamber to a lower access aperture.

It is inherent that a lower access aperture can be constituted by a plurality of apertures providing thereby a screen so that in the case that the filtering medium is sand or some fine particulate material, such will be retained from egress through any such aperture.

Now that it becomes possible to provide for significant back flushing pressures and volumes at an economic price, it further becomes viable then to consider a filter medium of different type in which some of the particles which are indeed the detritus can in fact be retained with a converging aperture, so as to provide of themselves the filtering effect but such that these can be adequately dislodged with a back flushing even though such back flushing flow must be provided through the narrowest gap and be expected to dislodge significantly wedged particles.

It is known to use filter members held together as a stack which define filter apertures between adjoining members to restrict detritus from passing therethrough. In this type of system, it is been necessary to separate and clean the filter members periodically which is time consuming and inefficient.

Accordingly as a further preferred form of this invention there is proposed that the above be now used in combination with a filter which is comprised of a plurality of filter members located in an adjoining relationship to form a stack, and a plurality of filtering gaps being defined between adjacent edges of the adjoining members.

In preference, in respect of the stack there are communicating passage ways passing ttransversely through the stack so as to provide for an access conduit on one side of each gap and a disposal conduit on the other side of the gap.

These and other features will be discernable by reference to the accompanying claims, and also by further reference to the description relating to the preferred embodiment which shall be now described.

Figure 2:
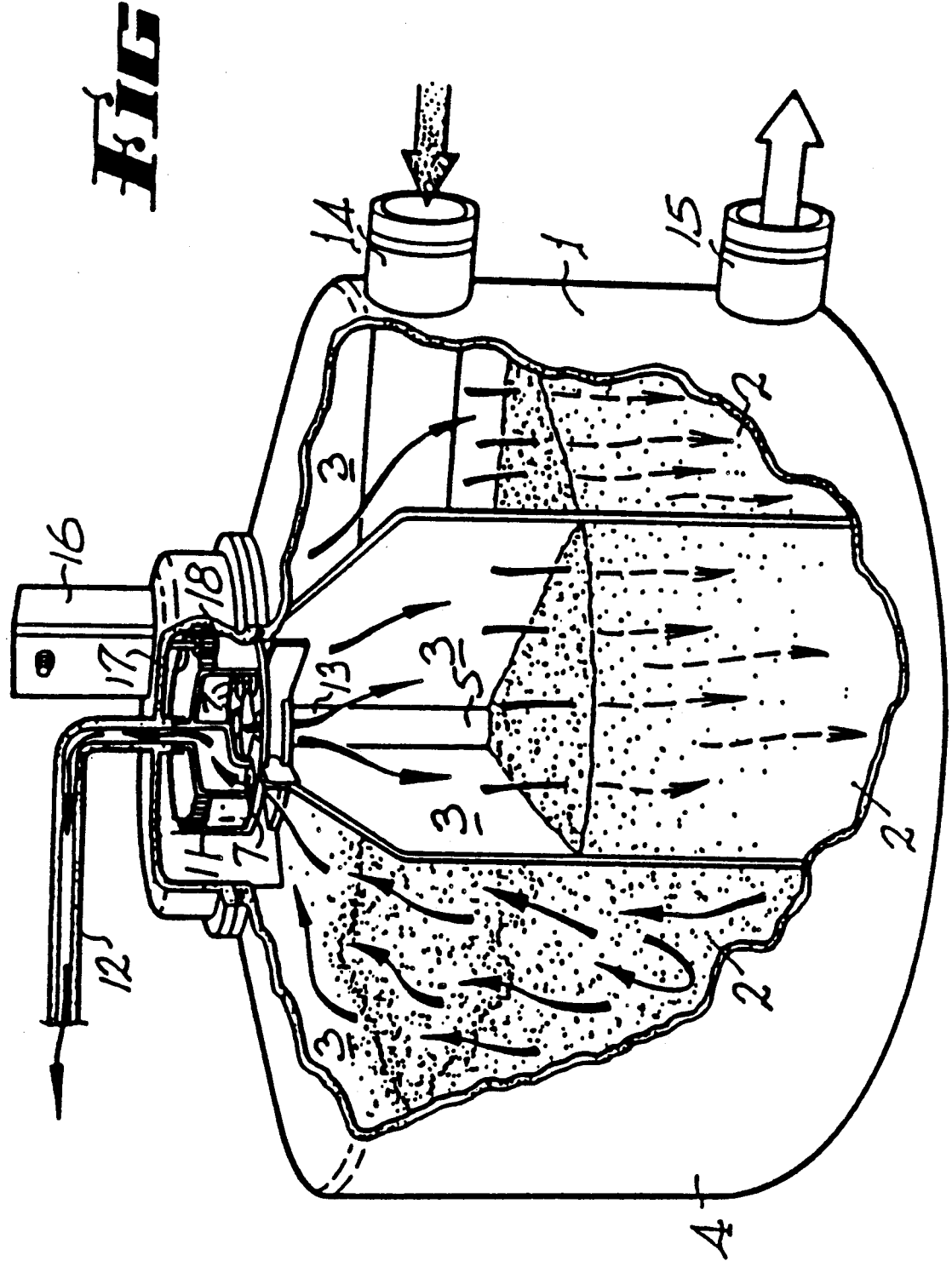
Figure 3:
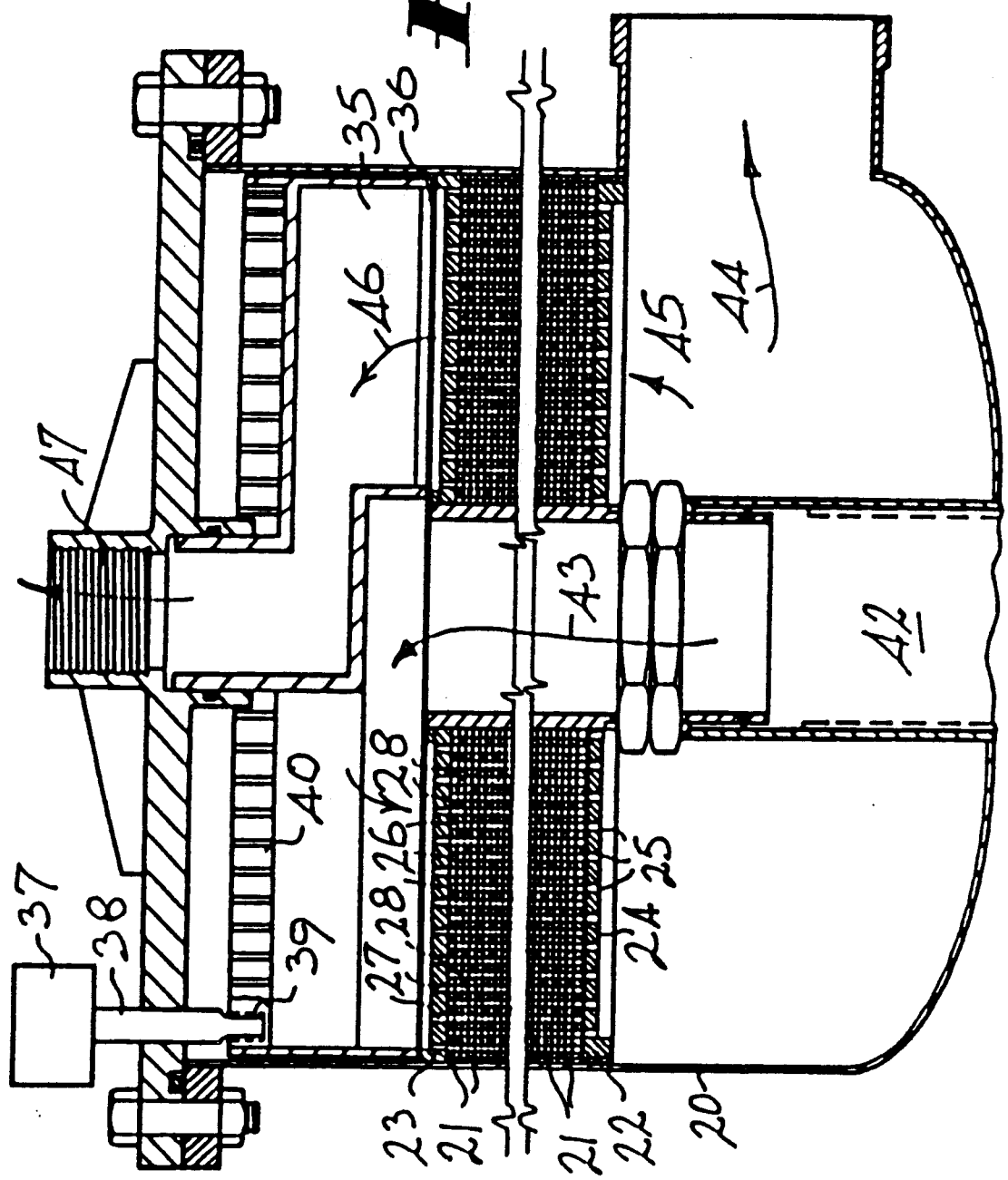
Figure 4:
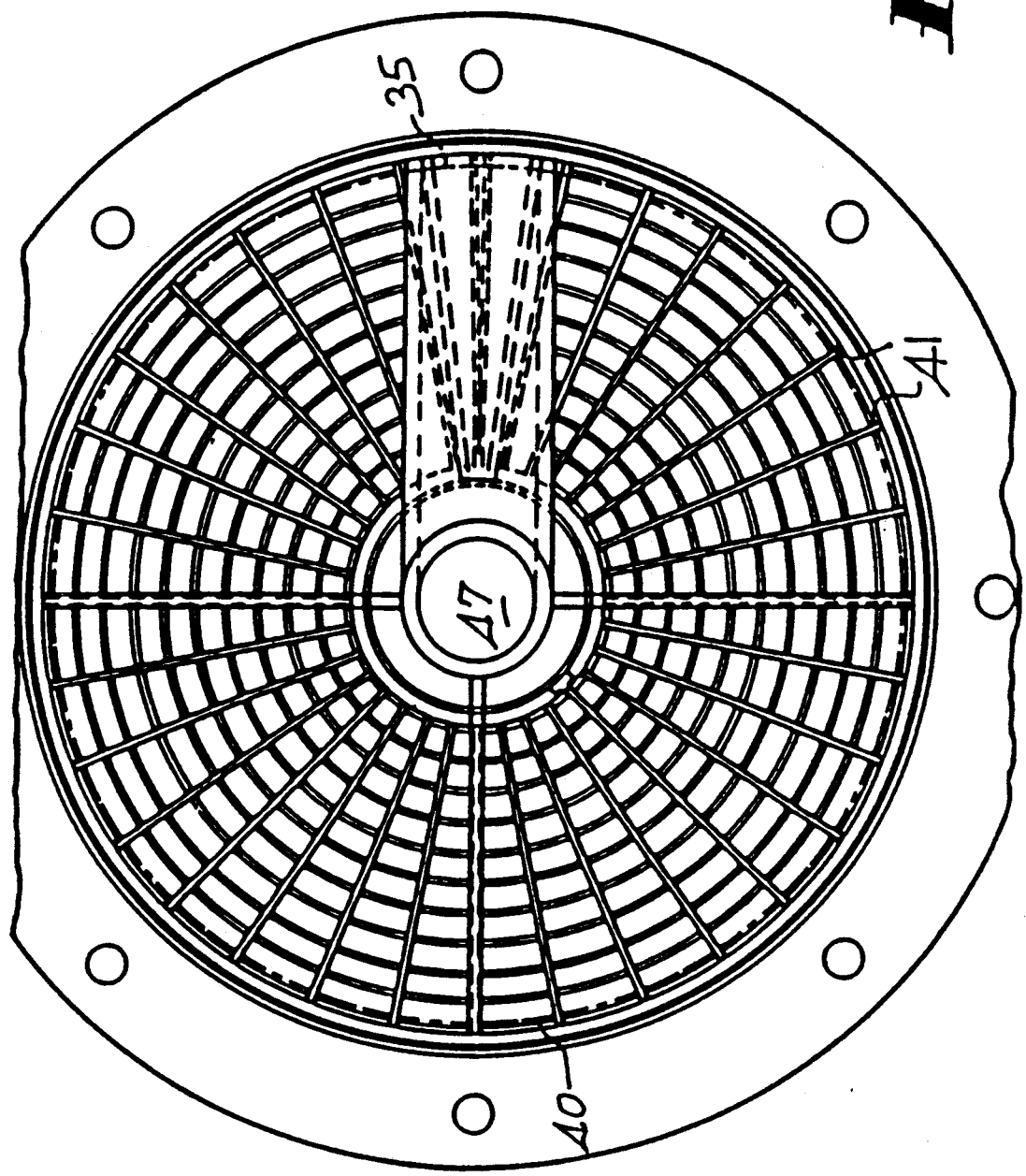
Figure 5:
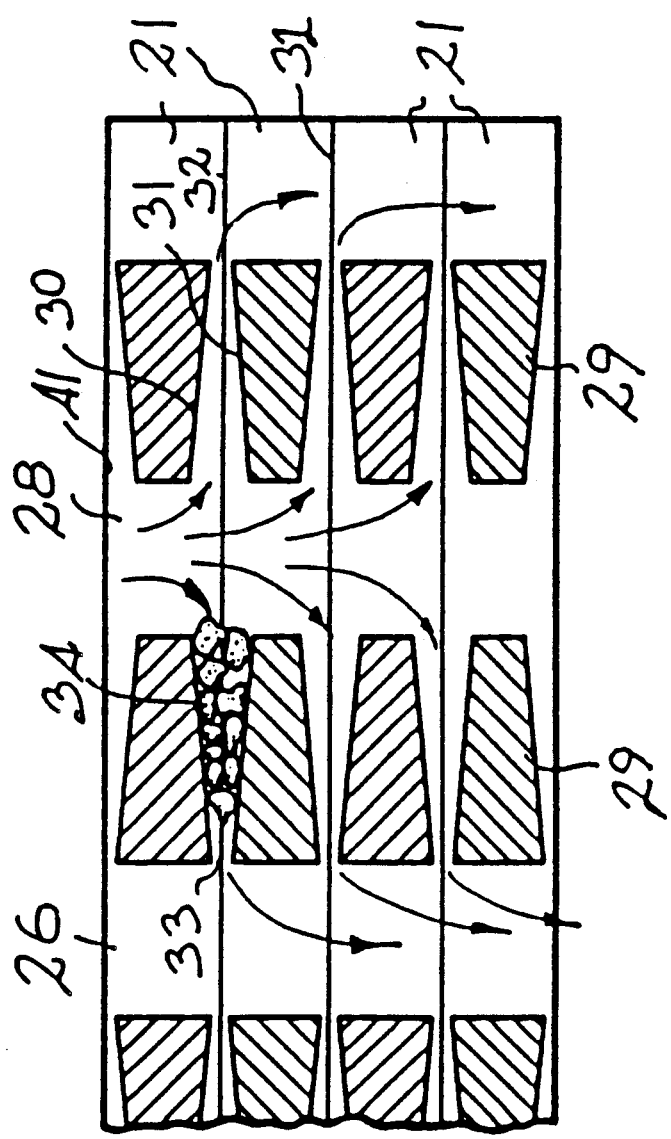
Figure 6:
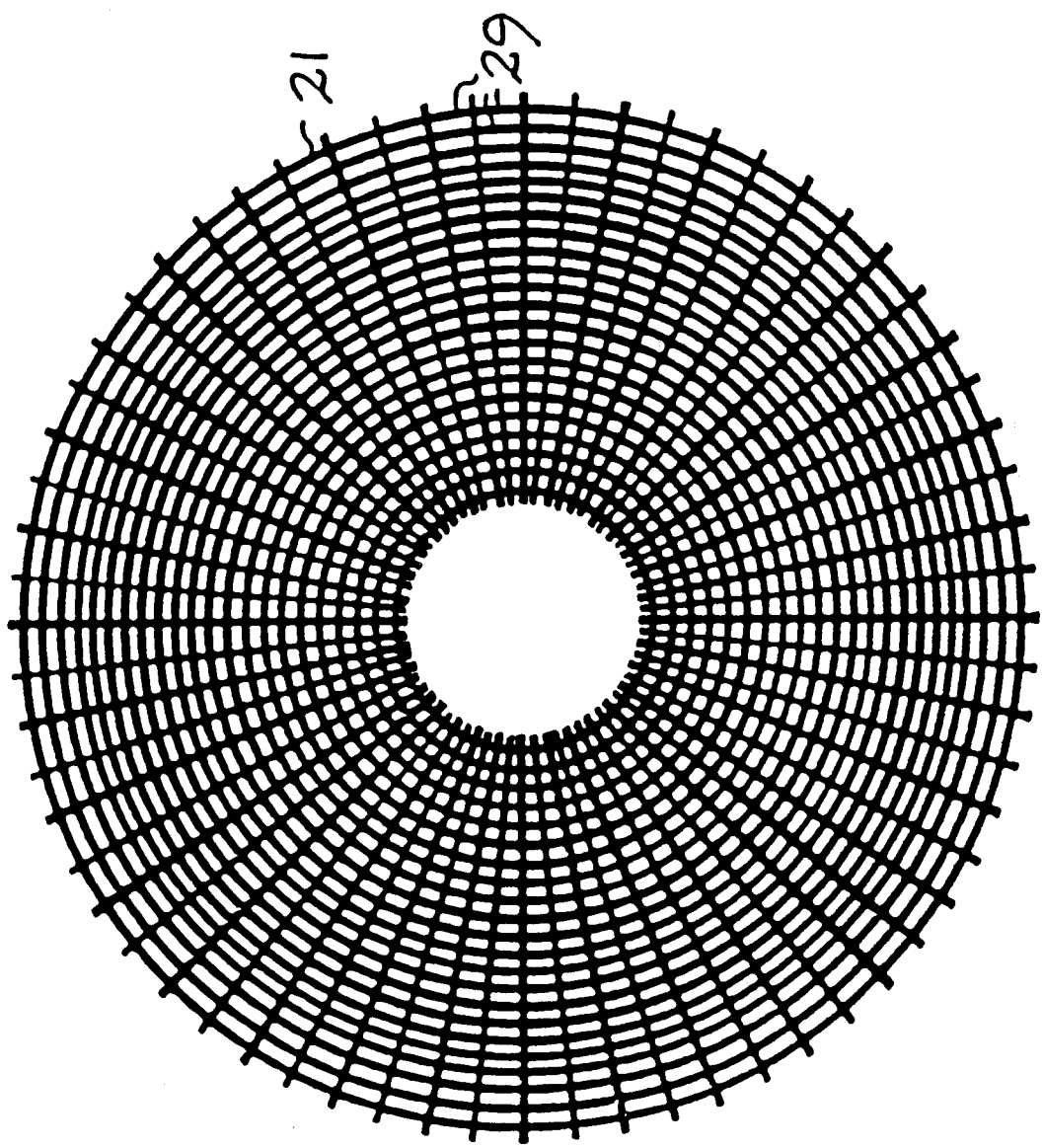

Referring to the several embodiments and the illustrations of these we note that:

FIG. 1 is a cross-sectional view with part cut away parts illustrating a filter constructed according to a first embodiment, FIG. 2 is a perspective view of the filter of FIG. 1, with however, part cut away showing three separate chambers two of which are in a conventional filtering mode and a third of which is in a back flushing mode, FIG. 3 is a cross-sectional view of a second embodiment incorporating a stack of filter elements, FIG. 4 is a view from above of the same embodiment as in FIG. 3 with a top cover part removed, FIG. 5 is an enlargement of a part of a stack of filter elements illustrating the arrangement for providing the filtering effect, and FIG. 6 is a plan view of one of the elements constituted in the stack of filter parts in the second embodiment.

Referring in detail to the drawings and particularly to the first embodiment as shown in FIGS. 1 and 2, there is a pressure sand filter which has a plurality of chambers 2 which are divided by dividers 3 which are fitted between an outer cylindrical container 4 and an inner upright conduit 5.

Each of the chambers 2 is characterised by having a lower access aperture 6 and an upper access aperture 7.

The lower access aperture is connected to be accessible to a lower part of the central conduit 5 at 8 through a tube 9 which includes a number of straining slots 10.

The straining slots 10 are selected to provide resistance to passage of siliceous particles e.g. sand during the filtering mode.

The upper access aperture 7 is adapted to be variously connected by means of rotary valve 11 so that one of the upper access apertures 7 is connected to conduit 12 which is directed to a disposal outlet while the remainder of the apertures 7 are connected through the upper part of the vertical conduit 5 at 13 whereby they are connected to inlet conduit 14 through which water can be directed which requires filtering.

The lower part of the vertical conduit 5 at 8 is connected to the outlet conduit 15 which is directed to provide passage for water that has been filtered.

The position of rotary valve 11 is adapted to be controlled by motor 16 operating which operates through shaft 17 whereby to effect rotation of gear 18 which operates against corresponding gear teeth on the outer side of the cover 11 at 19.

The controls operating gear 16 are such that there is a timer and a stepping function such that the rotary valve 11 is stepped through from a position corresponding as shown in FIG. 1 with a first upper access aperture 7 to a next position which is the next upper access aperture 7 in the adjacent vicinity so providing back flushing for a next adjacent chamber 2.

In practice with this arrangement, each of the chambers 2 is loaded with sand so that the height of sand in a compacted state that is for conventional filtering will be approximately half the height of the respective chamber, and that the size of the sand particles is generally greater to the extend of the slots 10.

As can now be seen by setting the timing function, controlling the motor 16, the rotary valve 11 can be variously positioned so as to provide for a back flushing effect for each of the chambers.

Of significance, howver, is that the extent of back flushing can be controlled in that all of the water filtered is available for back flushing if necessary by control using valves variously in the conduit 12 and the conduit 15 in that if the conduit 12 is completely closed, all of the water being filtered will issue through conduit 15 while if the conduit 15 is closed all of the water will issue through conduit 12.

Of further significance, however, is that the water being directed through the slots 10 when entering the back flushing mode chamber 2 is filtered so that detritus will simply not be available to be collected on the inside of the slots and hence available for return into the main body of water through conduit 15.

The extent of water available and the extent of pumping capacity necessary can be calculated for various sized filters but it will now be found that adequate back flushing flow is available from very much smaller pumps than has hitherto been the case, providing significant total economic advantage.

Now referring to the second embodiment as described in FIGS. 3, 4, 5 and 6, there is provided a substantially cylindrical container 20 which has within it a stack of filtering elements 21 which are each of annular shape as shown in FIG. 6 and each located one upon the other and held in this position by retaining ring 22 at the bottom and top plate 23.

At the bottom there is likewise a cover plate 24 of similar annular shape which has a plurality of aperture segments 25 passing therethrough which are aligned with egress columns 26 within the stack 21.

The top cover plate 23 has a plurality of apertures 27 which are in turn aligned with the entry columns 28 within the stack 21.

The drawing in FIG. 3 because of its small size only schematically shows these whereas the detail is shown in the enlarged cross-sectional view in FIG. 5.

To this extent therefore it is the detail of FIG. 5 that illustrates the cross-sectional parts of the stack of filter elements.

Each of the filter elements is comprised of wedge shape sections or sectors in cross-section as is shown at 29, each of the elements 21 having a substantially identical cross-sectional shape so that each of the elements provides an inclined surface as at 30 and at 31 each of which has the same angle of inclination providing a planar surface aligned to a meeting edge at 32 such that there is provided then a symmetrically aligned passage way having converging sides of decreasing width from an entry end or supply conduit at passage way 28 to an exit end or conduit at passage way 26 to form a narrow gap 33.

The narrowest gap at 33, the degree of inclination provided by the respective adjoining parts and the full length of the entry into the aperture is chosen so as to ensure in respect of the particles which will be required to be filtered, that there will be a trapping and compacting of such particles so that the particles themselves provide substantially the effective filtering.

Of importance, however, is that these factors are also chosen so that with the available water pressure in reverse, this will be sufficient to at least substantially remove such trapped particles such as is shown at 34 so that trapped detritus which would be blocking the filter could then be assuredly removed.

Such factors as the smoothness of the surface defining the gap, the material comprising a polypropylene plastic or otherwise which is used, and the comparative gradient all contribute to the effectiveness of the technique described but it is important to realise that such criteria must be chosen with the particular particles and detritus that are to be involved, accordingly some experimentation is inevitably necessary but the illustration given especially in FIG. 5 presuming the sides are smooth the defining sides 30 and 31 in each case are of the proportionate length as shown and are planar along their length accordingly. In this preferred instance, the absolute value of the gap 33 is 0.1 mm, and the walls or surfaces 30 and 31 defining the gap have a large distance apart of 0.8 mm. The remaining measurements can be proportioned from the specific measurements.

Now reverting to the broader description of the filter as a whole, the container 20 further includes a rotary valve 35 the lower end of which at 36 is shaped so as to coincide with a segment shaped upper part or sector of the stack and so as to engage with this to the extent that a reasonable water seal is effected especially with the entry passage way 27.

The position of the rotary valve 35 is governed by motor 37 which in turn drives through shaft 38 onto cog 39 which engages gears 40.

The motor 37 is once again governed so that it has two controlling functions a first a timing period function and a second a stepping function so that it is adapted to be driven for a period of time on a cyclic basis with a further given period between such actions such that the rotary valve 35 will accurately coincide with an appropriate segment at 36.

Each of the elements in the stack 21 includes radial dividing elements 41 together with the cover plate 23 such that each passage way 27 and 26 are separated segment to segment so that coincidence of the rotary valve 35 with one of the said segments will allow separately isolated flow of water through the respective segment. The dividing elements 41 separate the filter stacks 21 into sectors wherein each filter part in each sector will form filter apertures having a shape defining converging sides to a narrowest gap 33 as previously described. A stack thus forms an aperture in each sector as seen in FIG. 5 as at passage way 26.

In this way, by appropriately coupling an inlet water supply into conduit 42, water can be then initially directed in direction of arrow 43 whereupon the water will pass through the stack of filter elements 21 at the widest end of each filter aperture providing a filtering effect thereby. The exiting conduits 26 formed at the end of the stack 21 with the narrowest gap 33 may then collect detritus at the location of the narrowest gap 33 shown at 34 in FIG. 5.

A majority of the water can then be flushed out of outlet aperture in the direction of 44 while a portion of the water can be directed by reason of controlling the respective openness or closeness of the respective conduits through the segment being connected through the rotary valve 35.

Such a portion is then directed in the direction 46 so as to pass to a sump through outlet 47 this will then effectively connect a back flush flow to the exit conduit 46 for each selected sector to remove detritus 34. This then describes the second embodiment from which it will be seen that there can be provided a filter which in this case is not dependent upon being in any relative position to the ground to provide a filtering effect but which can be providing continuing back flushing with a sufficient head to provide back flushing effect which to a significant extent can be effected with cleansed water.

Although this embodiment relies upon some gathering of particulate materials upon a filtering function being returned but in practice as this is a very small proportion of the total amount of water which will actually be passing through the filter and further that it can be expected such detritus and particles will very quickly gather within the constraining gaps, this can provide filtered water with sufficient speed so as the small amount of detritus that might pass can be in most cases ignored.

Once again, however, the size of conduits, the capacity for pumping, and the total size of the filtering element all can be based on significantly smaller pressures and flow rates because of the concept of the invention.

It is self-evident that from time to time, the second embodiment article can be disassembled and completely cleansed if this is necessary by disassembling each of the filter elements from the stack, but it is expected that with careful selection of the gap inclinations and with the ability to provide high pressure back flushing with even the smallest of pumping capacity will make such action now very rare.

I claim:

1. A back flushable filter comprising a plurality of filter members, each filter member being generally annular in shape and being located in an adjoining cooperating relationship with other of the filter members to form a stack, each of the filter members including a plurality of divisions dividing each of said filter members into a plurality of radial sectors and within each sector a plurality of filter parts, each filter part in each sector being located and being shaped so as to provide in cooperation with and between filter parts of adjoining cooperating filter members, a plurality of filter apertures in each sector having a shape defining converging sides to a narrowest gap wherein said converging sides are formed from adjoining cooperating filter members, the filter members in the stack defining for each thus formed converging filter aperture and within each sector a plurality of supply conduits connecting to a widest end of each filter aperture, said supply conduits coupled to a source and the filter members defining a plurality of exit conduits within each sector connecting to a narrowest end of each filter aperture and means to connect a back flow to said exit conduits in one or more selected sector to effect a back flush through said plurality of filter apertures within said one or more selected sector.

2. A back flushable filter as in claim 1 in which each of the filter members is of a substantially annular shape in plan and each of the divisions extends in a direction radially aligned where the radial direction is aligned with a center of the annular shape.

3. A back flushable filter as in claim 2 in which each filter part extends in a substantially circumferential direction with respect to a center of the annular shape.

4. A back flushable filter as in claim 1 in which each sector is defined by divisions comprised of walls extending when viewed in plan in a radially aligned direction from the center of the annular shape and providing a fluid seal from adjacent sectors by reason of abutting edges of the respective walls.

5. A back flushable filter wherein there are filter means comprising a stack of filter members each of circular shape and plan, the stack being confined within a container, each of the filter members including a plurality of radial sectors and within each sector a plurality of filter parts which co-operate with a similar configuration of adjoining members to define therebetween a separating and converging aperture for filtering a liquid passing therethrough, each of the filter members having a dividing wall arranged to isolate a sector and filter apertures within the sector from adjacent sectors, a cover plate located at one end of the stack having apertures passing therethrough coinciding with entrance apertures within the stack which in turn coincide with a supply conduit defined between the segments interconnecting filter apertures with respective segments, a base plate at an opposite end of the stack from the cover plate, and having apertures passing therethrough coinciding with exiting apertures in the stack which in turn coincide with exiting conduits interconnecting the exit ends of filter apertures within respective sectors, and means adjustably positionable so as to be moveable from location to location of the stack whereby to connect for a back flushing directed through a selected sector or sectors.

* * * * *